United States Patent [19]
Skaggs

[11] Patent Number: 5,343,738
[45] Date of Patent: Sep. 6, 1994

[54] DOUBLE WALLED CONTAINMENT FUEL TRANSFER HOSE

[75] Inventor: Steven Skaggs, Cortland, Ohio

[73] Assignee: Furon Company, Aurora, Ohio

[21] Appl. No.: 962,979

[22] Filed: Oct. 16, 1992

[51] Int. Cl.$^5$ .................. F16L 11/20; G01M 3/18
[52] U.S. Cl. .................. 73/40.5 R; 138/113; 138/114
[58] Field of Search .......... 73/40.5 R, 49.1; 138/112, 113, 114, 124, 130, 137, 140, 148

[56] References Cited

U.S. PATENT DOCUMENTS

| | | | |
|---|---|---|---|
| 813,918 | 2/1906 | Schmitz | 165/141 |
| 3,464,450 | 4/1969 | Steffenini | 138/113 |
| 3,490,496 | 1/1970 | Stearns | 138/112 |
| 4,014,369 | 3/1977 | Kobres, Jr. | 138/112 |
| 4,157,194 | 6/1979 | Takahashi | 285/3 |
| 4,274,549 | 6/1981 | Germain | 220/86.2 |
| 4,570,686 | 2/1986 | Devine | 141/286 |
| 4,718,568 | 1/1988 | Dal Palo | 220/86.2 |
| 4,786,088 | 11/1988 | Ziu | 285/138 |
| 4,802,938 | 2/1989 | Kitami et al. | 138/137 |
| 4,805,444 | 2/1989 | Webb | 73/40.5 R |
| 4,906,496 | 3/1990 | Hosono et al. | 138/113 |
| 4,930,544 | 6/1990 | Ziu | 138/113 |
| 4,971,477 | 11/1990 | Webb et al. | 405/154 |
| 4,984,604 | 1/1991 | Nishimura | 138/137 |
| 5,005,613 | 4/1991 | Stanley | 141/45 |
| 5,040,408 | 8/1991 | Webb | 73/40.5 R |
| 5,098,221 | 3/1992 | Osborne | 405/52 |
| 5,101,918 | 4/1992 | Smet | 195/424 |
| 5,129,428 | 7/1992 | Winter et al. | 138/113 |
| 5,156,699 | 10/1992 | Nakuro et al. | 138/137 |

Primary Examiner—Hezron E. Williams
Assistant Examiner—Michael Brock
Attorney, Agent, or Firm—Fay, Sharpe, Beall, Fagan, Minnich & McKee

[57] ABSTRACT

A double walled hose assembly includes an elongate inner hose and an elongate outer hose enclosing the inner hose. Both the inner and outer hoses are flexible and made of a resilient material. The inner hose includes a fluid resistant inner layer, a tie layer encircling the inner layer and a reinforcing braid layer encircling the tie layer. An outer layer encircles the tie layer and the reinforcing braid such that the reinforcing braid is embedded between the tie layer and the outer layer. The outer hose is also made from a resilient material such that the outer hose is flexible. At least one rib extends between the inner hose and the outer hose. The at least one rib is secured to at least one of the inner hose and the outer hose and is made from a resilient material such that the rib is flexible. In this way, the hose assembly can be bent as necessary. The hose serves as a fluid transfer hose in a piping system for conveying a fluid from an outlet port of a pump to an inlet port of an above-ground fluid dispenser. A sensor wire may be provided between the two hoses to sense the presence of a fluid such as a fuel.

23 Claims, 7 Drawing Sheets

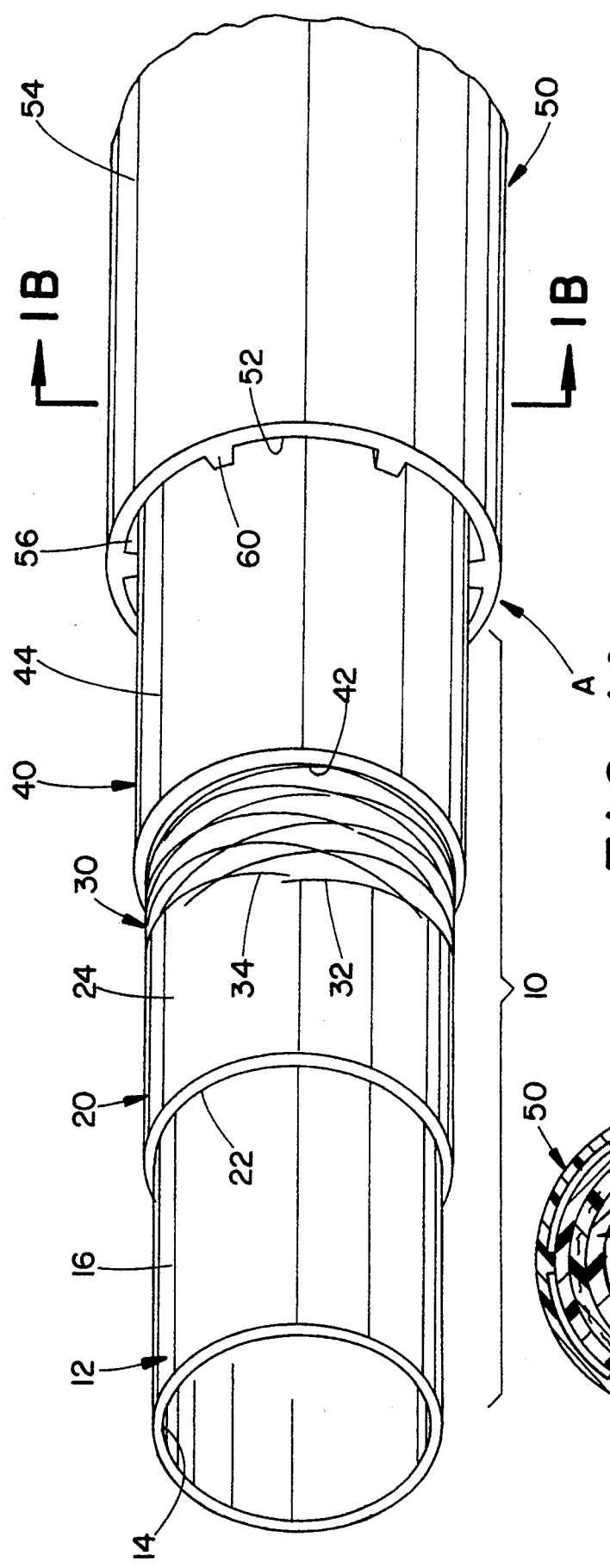
FIG. IA
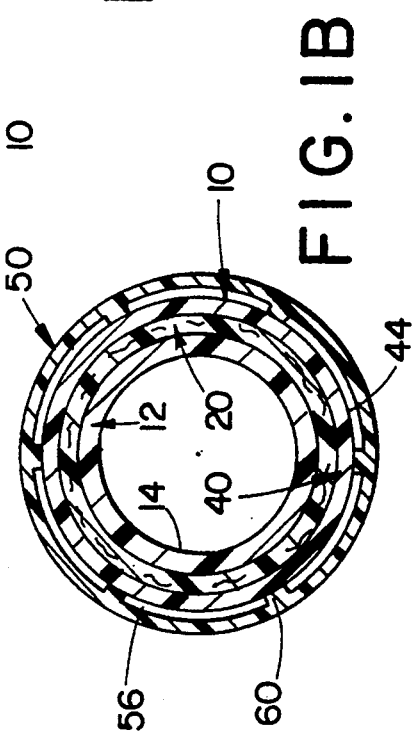
FIG. IB

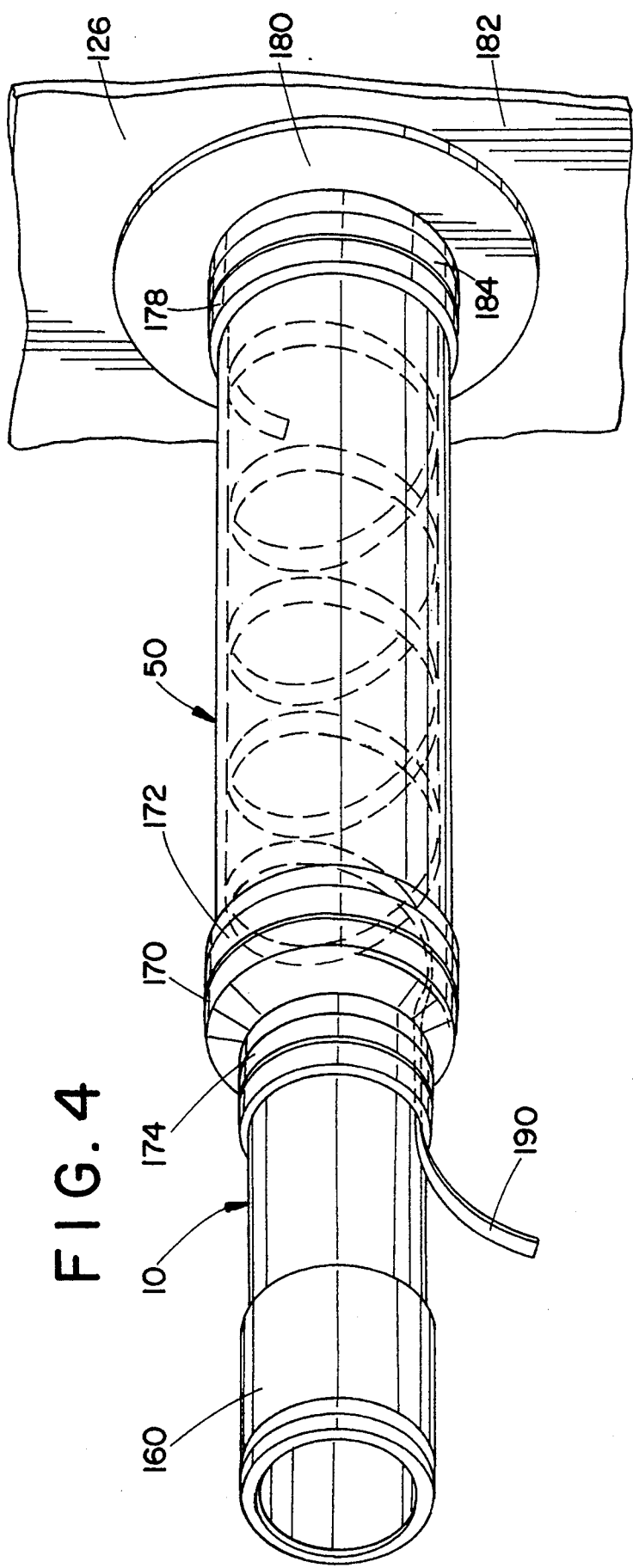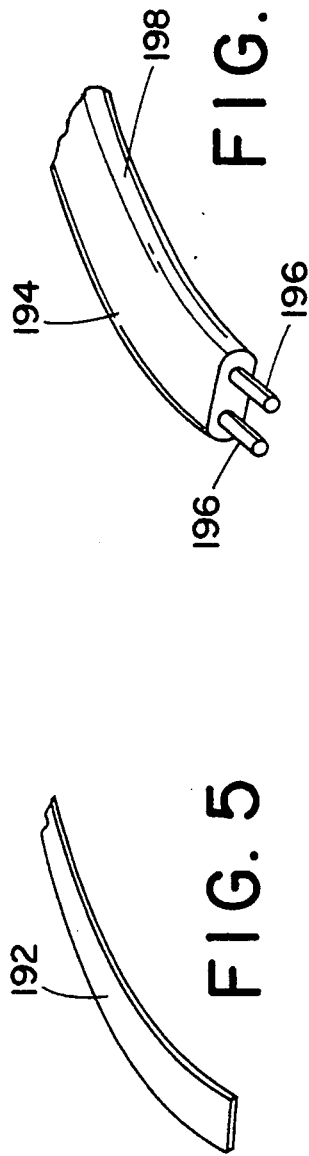

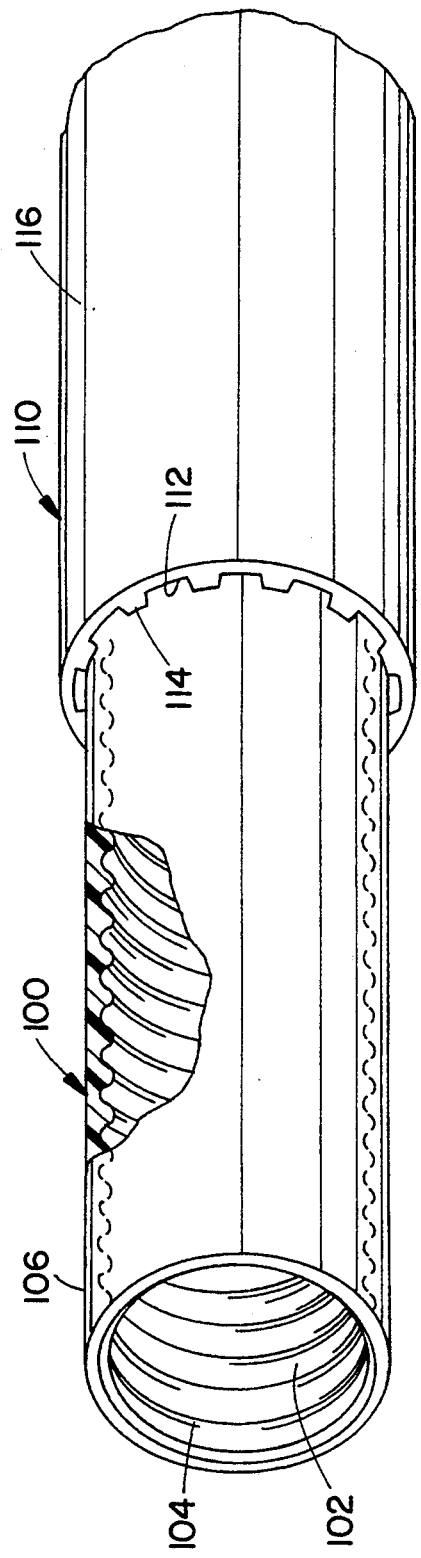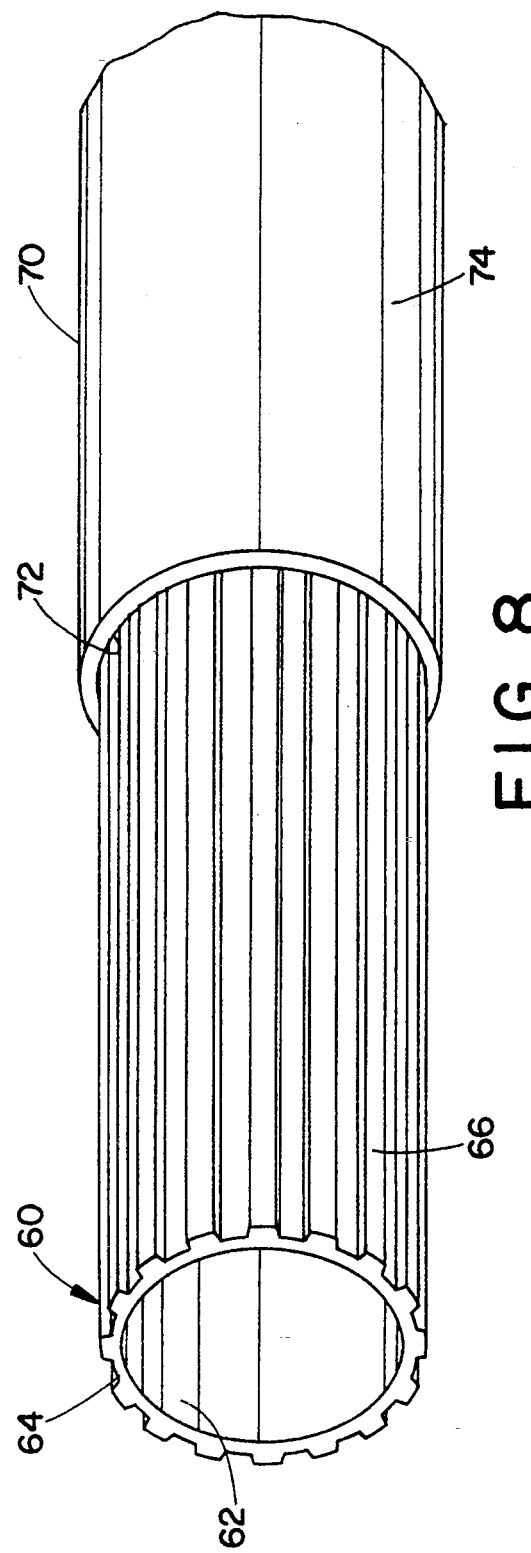

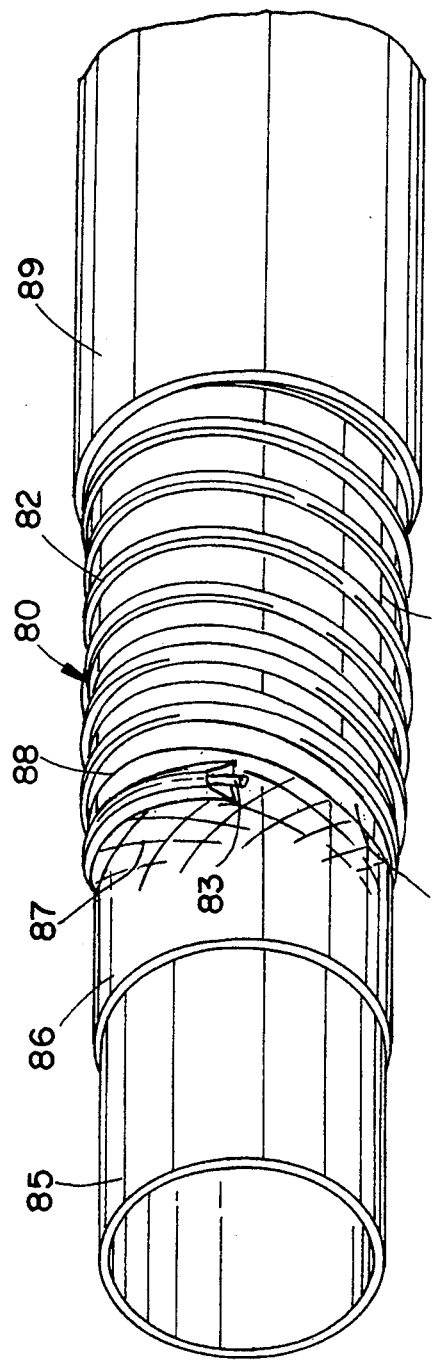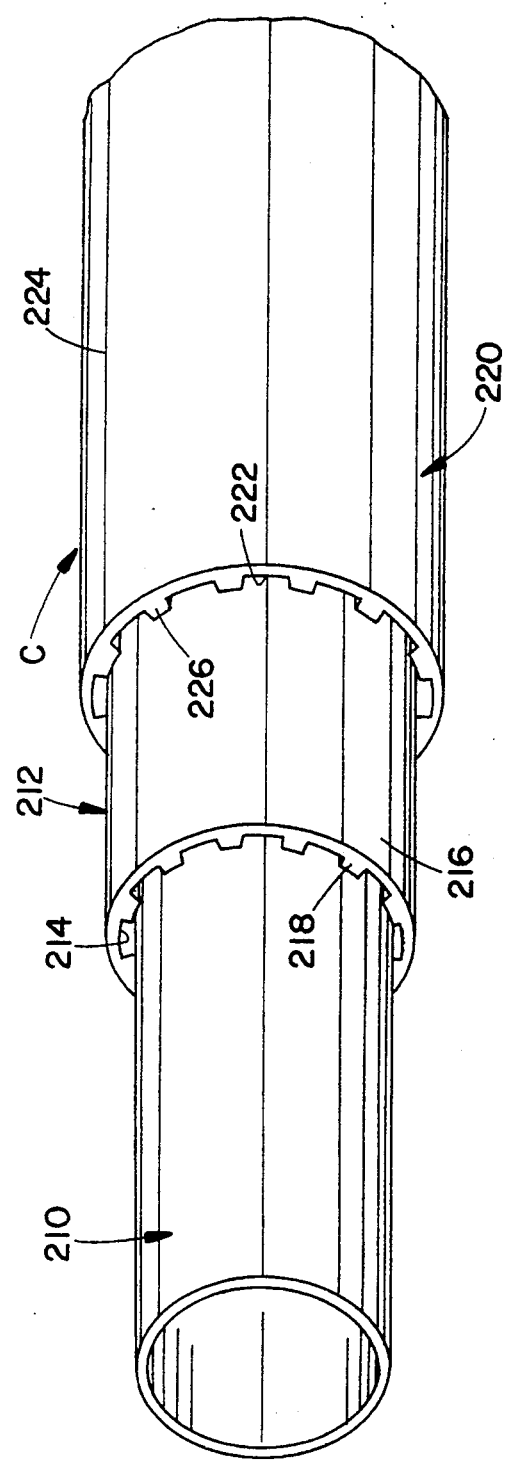

DOUBLE WALLED CONTAINMENT FUEL TRANSFER HOSE

BACKGROUND OF THE INVENTION

This invention relates to a double walled hose assembly. More particularly, the invention relates to a double walled hose assembly used in a fluid supply system to convey hazardous fluids.

While the invention is particularly applicable to double walled hose assemblies used in the petroleum, chemical and natural gas industries, it should be appreciated that such a hose assembly can be utilized in connection with any type of installation in which leakage of a hazardous fluid into the surrounding environment over long periods of time and without detection will produce extensive pollution and an environmental hazard. Such pollution is likely to be difficult and expensive to clean up when it is ultimately found.

A conventional underground fluid piping systems such as is utilized in, e.g. a service station environment, is typically made of steel, fiberglass or plastic. Such systems include rigid straight lengths of pipe together with T-fittings, elbows, connector fittings, union fittings and the like. The assembly of these components creates a fluid piping system with many joints and typically a layout design that has many turns in congested plumbing areas. Since the primary source of leaks is at the joints and fittings of a system, such systems are prone to leakage. In addition, the many fittings are adversely affected by ground movement during the life of the fluid system as well as by improper installation and environmental degradation such as corrosion.

In response to environmental regulations and ever stricter pollution control requirements at the federal, state and local levels, strict regulations have been implemented for underground piping which transmits hazardous fluids. Equipment manufacturers have responded by developing a variety of secondary containment systems for conventional underground piping. Such containment systems are designed to prevent the fluid that may leak from the inner pipe or hose from escaping into the environment. One approach for such a secondary containment system has been to line the piping trench for the hose with a flexible membrane liner or a semi-rigid trough. While such an approach provides a measure of containment of the leaking product, it does not allow for effective leak detection because the location of the leak cannot be easily determined. Also, an integrity check of the secondary containment system by means of air pressure testing and the like is not possible since the system does not provide a 360° containment of the leaking fluid.

Another approach has been to utilize a rigid larger diameter pipe to enclose the conventional fluid rigid supply pipe. However, these types of secondary containment systems are generally expensive and time consuming to install. Also, the outer pipe is prone to leakage as is the product supply pipe. Still another approach has been to encase the rigid product supply pipe with a larger diameter convoluted, and therefore flexible, plastic pipe that contains not only the rigid product pipe but also several of the fittings for the product pipe. However, this type of containment system is still expensive and one cannot identify the location of a leak in the product pipe.

Still another recent suggestion has been to provide a secondarily contained piping system in which a flexible supply pipe is positioned within a rigid corrugated secondary containment pipe. With this type of system, once a leak has been identified in the fluid supply pipe, the length of that pipe in which a leak has occurred can be removed from an underground location through an access chamber after the pipe is uncoupled from adjacent sections of the pipe. The leaking section can then be replaced with a new length of pipe. However, this proposal is difficult to employ in practice since the fluid supply pipe is resistant to the type of bending necessary to pull it out of the secondary containment pipe. In addition, necessarily, a large diameter secondary containment pipe is required in order to allow one to try and pull the fluid supply pipe out of the secondary container pipe once a leak has been detected. Also, this system does not positively identify the location of the leak.

Accordingly, it has been considered desirable to develop a new and improved double walled hose assembly which would overcome the foregoing difficulties and others while providing better and more advantageous overall results.

BRIEF SUMMARY OF THE INVENTION

In accordance with one aspect of the present invention, a new and improved double walled hose assembly is provided.

More particularly in accordance with this aspect of the invention, the assembly comprises an elongate inner hose made of a resilient material such that the inner hose is flexible. The inner hose comprises a fluid resistant inner layer, a tie layer encircling and adhering to the inner layer, a reinforcing braid layer encircling the tie layer and an outer layer encircling and adhering to the tie layer and the reinforcing braid such that the reinforcing braid is embedded between the tie layer and the outer layer. An elongate outer hose encloses the inner hose. The outer hose is made from a resilient material such that the outer hose is flexible. At least one rib extends between the inner hose and the outer hose. The at least one rib is secured to at least one of the inner hose and the outer hose. The at least one rib is made from a resilient material such that the rib is flexible so that the hose assembly can be bent as necessary.

Preferably, the at least one rib is of one piece with and projects from an inner wall of the outer hose towards the center of the outer hose. In the preferred embodiment, a plurality of such ribs extend along a longitudinal axis of the outer hose such that the inner and outer hoses are concentric. A fluid sensor is preferably located between the inner and outer hoses for sensing a presence of a fluid leaking out of the inner hose. If desired, an elongate third hose can enclose the outer hose and at least one second rib can be positioned between the third hose and the outer hose with the at least one second rib being secured to at least one of the third hose and the outer hose. Both the third hose and the at least one rib are made from a flexible resilient material so that the third hose is flexible.

According to another aspect of the present invention, a leak proof fuel hose assembly is provided.

In accordance with this aspect of the invention, the assembly comprises an elongate flexible inner fuel carrying hose made of a resilient material. An elongate flexible containment hose encloses the fuel carrying hose. The containment hose is made from a resilient material. An annular gap is formed between the fuel carrying hose and the containment hose wherein the outer hose contains any fuel which may have leaked out of the inner hose and into the gap. At least one rib extends between the fuel carrying hose and the containment hose in the annular gap for spacing the inner hose from the outer hose. The at least one rib is secured to at least one of the inner hose and the outer hose such that the rib is made from a resilient material. A fluid sensor is located in the annular gap for sensing the presence of a fluid leaking out of the inner hose.

In accordance with still another aspect of the invention, a piping system is provided for conveying a fluid from an outlet port of a pump to the inlet port of an above-ground fluid dispenser.

More particularly in accordance with this aspect of the invention, the system comprises a fluid transfer hose of a flexible material having an inlet end and an outlet end. The fluid transfer hose comprises a fluid resistant inner layer, a tie layer encircling the inner layer, a reinforcing braid layer encircling the tie layer and an outer layer encircling the tie layer and the reinforcing braid such that the reinforcing braid is embedded between the tie layer and the outer layer. A containment hose of a flexible material having a first end and a second end surrounds the fluid transfer hose. A means for spacing the fluid transfer hose from the containment hose is provided so as to form a gap therebetween. The gap contains any fluid which may be leaked from the fluid transfer hose. A first coupling is provided to which an inlet end of the fluid transfer hose is secured. A second coupling is provided to which the outlet end of the fluid transfer hose is secured.

One advantage of the present invention is the provision of a new and improved double walled hose assembly.

Another advantage of the present invention is the provision of a double walled hose assembly including a flexible inner hose that comprises a fluid resistant inner layer, a tie layer, a reinforcing braid layer and an outer layer such that the reinforcing braid is embedded between the tie layer and the outer layer.

Still another advantage of the present invention is the provision of a double walled hose assembly including an elongate inner hose, an elongate outer hose and at least one rib extending between the inner hose and the outer hose. The at least one rib is preferably secured to at least one of the inner hose and the outer hose.

Yet another advantage of the present invention is the provision of a double walled hose assembly in which at least one rib extends between the inner hose and the outer hose. The at least one rib can be of one piece with and made from the same material as the inner hose or the outer hose. Alternatively, the at least one rib can be of a different material, i.e. such as a spring steel wire, which is embedded in one of the inner hose or the outer hose in such a way as to form a ribbed surface on one of the two hoses.

Still yet another advantage of the present invention is the provision of a double walled hose assembly in which the outer hose closely encircles the inner hose with there being a gap just thick enough between the two to accommodate one or more ribs which create channels to allow any fluid leaking out of the inner hose to be vented by the outer hose. The outer hose can have a relatively small wall thickness in relation to the wall thickness of the inner hose.

A further advantage of the present invention is the provision of a leak proof fuel hose assembly that comprises an elongate flexible inner fuel carrying hose, an elongate flexible containment hose enclosing the fuel carrying hose, and at least one rib extending between the fuel carrying hose and the containment hose and secured to one of the two hoses to form a fluid conveying channel between the two hoses.

A still further advantage of the present invention is the provision of a double walled hose assembly which includes an inner hose, an outer hose and a fluid sensor located between the inner and outer hoses for sensing the presence of a fluid leaking out of the inner hose. Preferably, the fluid sensor is an elongated sensor wire which extends longitudinally between the two hoses.

A yet further advantage of the present invention is the provision of a triple walled hose assembly including an elongate inner hose, an elongate outer hose encircling the inner hose and an elongate third hose encircling the outer hose. This construction allows for the collection of fluid vapors during the refueling process such that the vapors are returned back to the storage tank. Any permeation which could occur from the inner hose would be contained in the vapor containment layer.

An additional advantage of the present invention is the provision of a piping system for conveying a fluid from an outlet port of a pump to the inlet port of an above-ground fluid dispenser. Such a piping system comprises a fluid transfer hose, a containment hose, a means for spacing the fluid transfer hose from the containment hose so as to form a gap therebetween and couplings provided on each end of the fluid transfer hose. Preferably, sumps are provided at each end of the containment hose. Secured to the walls of the sumps are the ends of the containment hose such that the first and second couplings of the fluid transfer hose are located within respective sumps.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts preferred and alternate embodiments of which will be described in detail in this specification and illustrated in the accompanying drawings which form a part hereof and wherein:

FIG. 1A is a perspective view, with layers partially removed, of a double walled hose assembly according to a preferred embodiment of the present invention;

FIG. 1B is a cross-sectional view of the hose assembly of FIG. 1A on a reduced scale;

FIG. 4 is a perspective view on an enlarged scale of a portion of the double walled hose assembly of FIG. 1A as it would appear within a sump of the type illustrated in FIG. 3;

FIG. 5 is a perspective view of a first type of elongated fluid sensor strip utilized in the embodiment of FIG. 4;

FIG. 6 is a perspective view of a second type of elongated fluid sensor strip utilized in the embodiment of FIG. 4;

FIG. 7 is a perspective view, partially broken away, of a double walled hose assembly according to a first alternate embodiment of the present invention;

FIG. 8 is a perspective view of a double walled hose assembly according to a second alternate embodiment of the present invention;

FIG. 9 is a perspective view of a double walled hose assembly according to a third alternate embodiment of the present invention;

FIG. 10 is a perspective view of a triple walled hose assembly according to the present invention;

DETAILED DESCRIPTION OF THE PREFERRED AND ALTERNATE EMBODIMENTS

Figure 2:
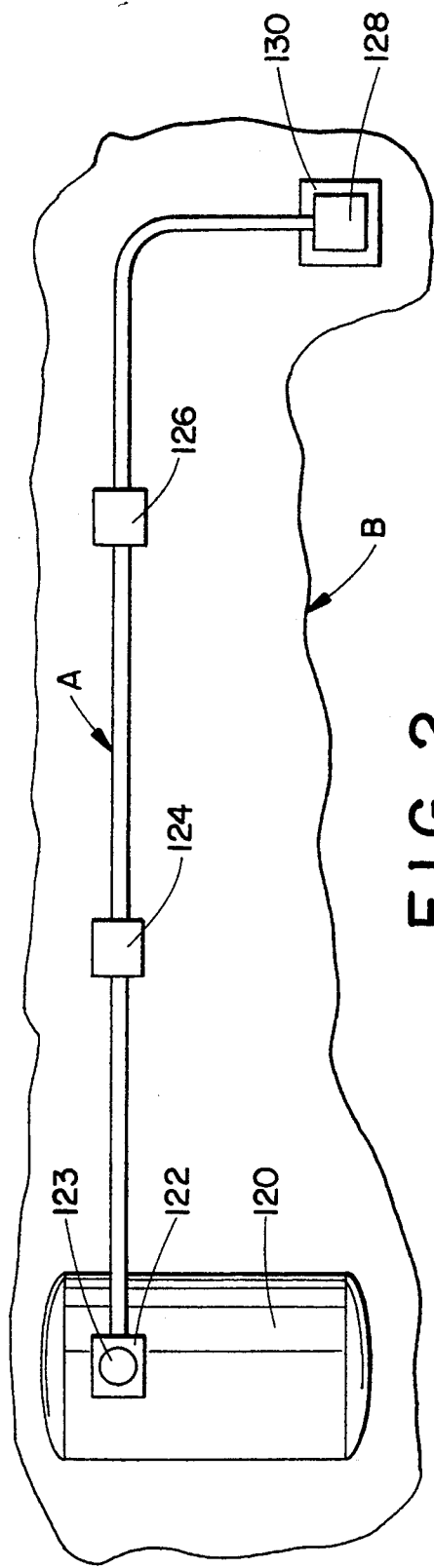
FIG. 2 is a diagrammatic top plan view of a fuel supply and dispensing system utilizing the double walled hose assembly of FIG. 1A.
Figure 3:
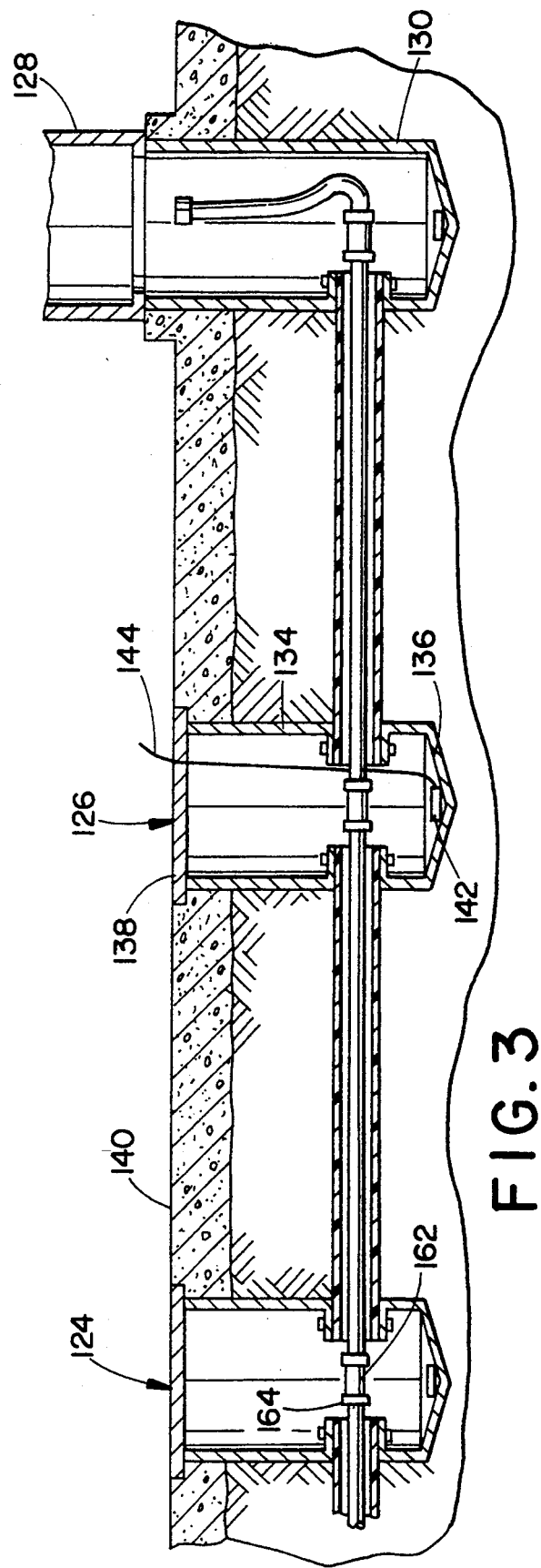
FIG. 3 is an enlarged side elevational view of a portion of the fuel supply and dispensing system of FIG. 2 partially in cross section.

Referring now to the drawings wherein the showings are for purposes of illustrating preferred and alternate embodiments of the invention only and not for purposes of limiting same, FIG. 1A shows the subject new double walled hose assembly A of the type that can be utilized in a fluid dispensing system B such as is disclosed in FIGS. 2 and 3. While the double walled hose assembly is primarily designed for and will hereinafter be described in connection with a fuel supply and dispensing system, it should be appreciated that the double walled hose assembly disclosed could also be utilized in connection with any other type of fluid storage and dispensing system in which leakage of the fluid from the system is considered environmentally undesirable.

The double walled hose assembly A according to the present invention preferably comprises an inner hose 10 that includes a fuel resistant inner layer 12 having an inner periphery 14 and an outer periphery 16. Also provided is a tie layer 20 which is preferably made of a different material and includes an inner periphery 22 that contacts the outer periphery 16 of the inner layer 12 and an outer periphery 24. Preferably, the inner layer 12 and the tie layer 20 are co-extruded of compatible plastic materials so that the two layers are bonded together.

In contact with the tie layer outer periphery 24 is a reinforcing braid layer 30 that comprises a plurality of cords 32 oriented in a first direction and a plurality of cords 34 oriented in a second direction such that the cords cross each other to form an open-weave mesh as shown in FIG. 1. Enclosing the braid layer 30 is an outer jacket layer 40 which includes an inner periphery 42 that contacts the braid layer 30 and the outer periphery 24 of the tie layer in the open areas of the braid layer mesh. The outer jacket also includes an outer periphery 44. The tie layer 20 and the outer layer 40 contact each other such that the reinforcing braid 30 is embedded between the tie layer and the outer layer.

The inner layer can be made of a fuel grade plastic such as a nylon material so as to have an inner diameter of 1.500" (3.81 cm) and a wall thickness of 0.035 inches (0.089 cm). The tie layer can be made of a polyurethane material such as TPU and can have a wall thickness of 0.065" (0.165 cm) such that the outer diameter of the tie layer 20 is 1.700" (4.318 cm). The braid layer is preferably made from a polyester yarn type material. The outer jacket 40 can have a wall thickness of 0.05" (0.13 cm) such that the outer diameter of the outer jacket 40 is 1.800" (4.572 cm). The outer jacket 40 can be made from a material which adheres to the tie layer so as to ensure that the braid layer 30 remains trapped therebetween. To this end the outer jacket can be made of a nylon material, although TPU could also be used. It is important that the layers of the inner hose 10 remain integral and do not separate if fuel seeps therethrough. Such separation would obviously be deleterious to the integrity of the hose since the hose would then no longer be capable of sustaining the pressures at which the fluid is pumped therethrough. In addition, any separation of the layers of the hose means that the hose is no longer kink-resistant and this is an important characteristic for the hose.

While a 1.5" (3.81 cm) inner diameter hose has been described in the previous paragraph, it should be appreciated that hoses of any other selected diameter, such as a 2" (5.08 cm) inner diameter could also be produced depending upon the application for which the inner hose 10 is adapted.

An elongate outer hose 50 encloses the inner hose 10. The outer hose 50 has an inner periphery 52 and an outer periphery 54. A gap 56, which is preferably annular, is formed between the outer periphery 44 of the inner hose 10 and the inner periphery 52 of the outer hose 50. Preferably, at least one rib 60 extends in the gap 56 between the inner hose 10 and the outer hose 50. The at least one rib 60 is preferably secured to at least one of the inner hose and the outer hose. In the embodiment of FIG. 1, the at least one rib 60 is secured to the inner periphery 52 of the outer hose 50. As is evident from FIG. 1, a plurality of such ribs 60 are provided in a spaced manner around the inner periphery 52 of the outer hose 50 such that the ribs extend along a longitudinal axis of the outer hose so that the inner and outer hoses are concentric. As is evident, the ribs 60 project from the inner wall 52 of the outer hose towards a central longitudinal axis of the outer hose. It is preferable that a minimum number of such ribs 60 extend around the inner periphery of the outer hose 50 so as to allow relatively large channels through which any fluid leak from the inner hose can flow through the outer hose.

The inner diameter of the outer hose can be on the order of 1.8" (4.572 cm) with a wall thickness of 0.05" (0.127 cm). Therefore, the outer diameter of the outer hose can be 1.9" (4.83 cm). Of the 0.05" (0.127 cm) thickness of the outer hose, approximately half can be the thickness of the wall itself with the other half being contributed by the height of the rib 60. The outer hose 50 can be made from a material with a good fuel penetration resistance such as nylon although TPU or polyethylene could also be used if desired.

As is evident from FIG. 1B, the inner hose 10 is considerably thicker than the outer hose 50. That is because the inner hose needs to contain fluid, such as fuel, under pressure whereas the outer hose is used merely to contain any fluid which may have leaked through the inner hose 10 and convey such fluid away.

It should be appreciated, however, that other desired dimensions can be provided for the outer hose. In addition, other configurations for the ribs between the two hoses can be provided.

In this regard, FIG. 8 discloses a hose assembly having an inner hose 60 with a smooth inner periphery 62 and an outer periphery 64 provided with ribs 66 which extend longitudinally. An outer hose 70, having smooth inner and outer peripheries 72 and 74 encloses the inner hose. As is evident, the plurality of ribs 66 extend radially outwardly from the outer periphery 64 of the inner hose 60 so as to space the outer hose inner periphery 72 from the inner hose outer periphery 64 and allow fluid channels to be located therebetween. It should be noted that the inner hose 60 preferably has the same construction as does the inner hose 10 shown in FIG. 1A, namely, an inner layer, a tie layer, a braid layer and an outer layer.

FIG. 9 discloses yet another embodiment in which an inner hose 80 has on an outer periphery 81 thereof a plurality of ribs 82. In this embodiment, the ribs are formed such that they comprise a strand 83 of a hard material which is embedded in the inner hose 80 preferably within an outer layer 84 thereof. The hard material can either be a metal wire or the like or a strand of a harder thermoplastic. The hard material 83 is embedded in a strip of the thermoplastic material which comprises the outer layer 84. The strip of material is then spiralled around the preformed inner layer 85, tie layer 86 and braid layer 87 so that adjacent side edges of the strip comprising the outer layer 84 meet each other and fuse to each other along a bond line 88. The ribs 82 help space the inner hose 80 from an outer hose 89. Unlike the embodiment shown in FIG. 8, however, the ribs 82 spiral around the outer periphery 81 of the inner hose 80.

Figure 14:
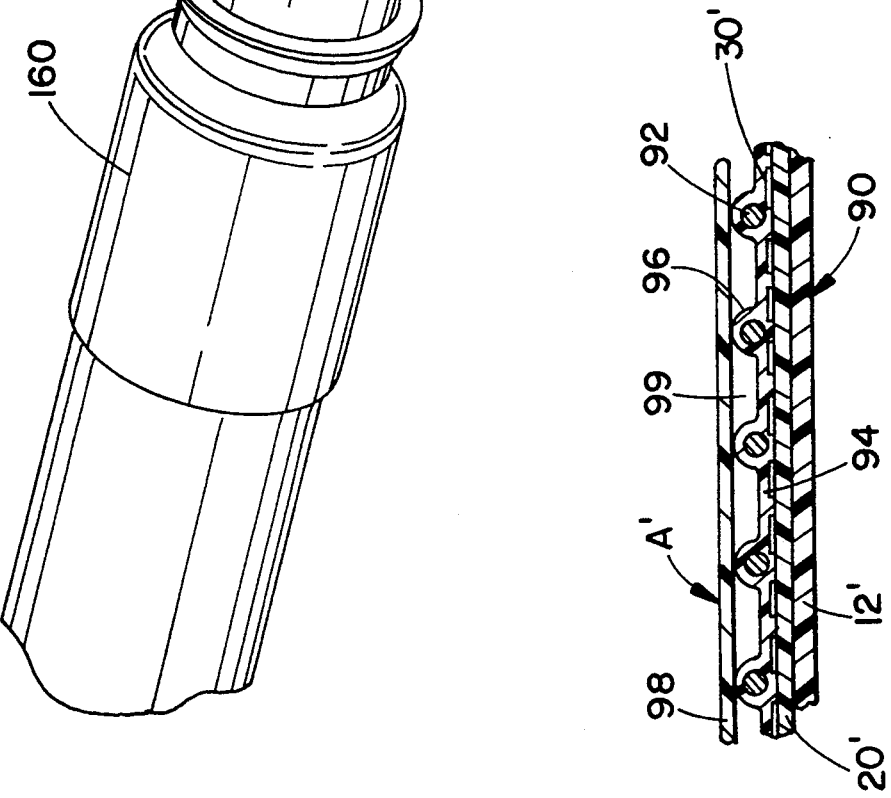
FIG. 14 is a cross-sectional view of a hose assembly according to another preferred embodiment of the present invention; and, FIG. 15 is an exploded perspective view of one end portion of the double walled hose assembly of FIG. 1A illustrating a coupling thereof along with a fitting and a collar for joining the two.

In the embodiment of FIG. 14, another preferred embodiment of the invention is illustrated. For ease of comprehension and appreciation of this embodiment, like components will be identified by like numerals with a primed suffix and new components will be identified by new numerals.

In this embodiment, the double walled hose assembly A' comprises an inner hose 90 that includes a fuel resistant inner layer 12' and a tie layer 20'. As in the embodiment of FIG. 1, the inner layer 12' and the tie layer 20' are preferably made of different materials. In contact with the tie layer is a reinforcing braid layer 30' which comprises a plurality of cords oriented in first and second directions in an open-weave mesh. Unlike the embodiment of FIG. 1A, however, in the embodiment of FIG. 14, a wire 92 is spiralled around the braid layer 30'. Thereafter, the wire and the braid layer are embedded in an outer jacket 94. The outer jacket encloses the braid layer 30' and the wire 92 such that an inner periphery of the outer jacket 94 contacts the braid layer 30' and the outer periphery of the tie layer 20' in the open areas of the braid layer mesh 30'. Due to the presence of the wire 92 coiling around the braid layer as encased by the outer jacket 94, the inner hose 90 is provided with outwardly extending ribs 96. Closely encircling the inner hose 90 is an outer hose 98 which contacts the ribs 96 of the inner jacket 90 as is evident from FIG. 14. In this way, channels 99 are defined between the inner hose 90 and the outer hose 98. Such channels allow any fluid which may leak out of the inner hose 90 to be conducted away. Unlike the embodiment of FIG. 1A, however, the outer hose 98 is not provided with any ribs as such are located on the inner hose.

The wire can be a spring steel wire having a diameter of 0.047 to 0.060 inches (0.12 to 0.15 cm). The spacing between loops of the wire can be on the order of $\frac{3}{8}''$ (0.95 cm). The wire aids in the flexibility and kink resistance of the inner hose 90. This is particularly advantageous when the inner hose has an inner diameter of 2" (5.08 cm) or larger. In other words, this design is advantageous for use in larger diameter hoses where, due to the size of the hose, it is necessary to aid the flexibility of the hose as well as its kink resistance.

While the outer hose 98 is not shown as having any ribs along its inner periphery, unlike FIG. 1A, such ribs could also be utilized if that was considered desirable or advantageous. In such a case, the points of contact between the inner hose and the outer hose would only be at the points where the ribs of the inner hose contact the ribs of the outer hose.

To manufacture the embodiment illustrated in FIG. 14, one would proceed as outlined above with regard to FIG. 1A initially by co-extruding the inner layer 12' and the tie layer 20' and pulling thereover the braid 30'. Thereafter, the wire 92 would be coiled over the braid in such a way that the wire would contact the braid along the inner surface of the wire. Thereafter, the outer jacket 94 can be extruded over this structure to form the inner hose 90. Subsequently, the outer hose 98 can be slipped over the inner hose 90.

Still yet another embodiment is disclosed in FIG. 7. In this figure, an inner hose 100 includes an inner periphery 102 that is provided with a plurality of corrugations 104 and a smooth outer periphery 106. Also provided is an outer hose 110 having an inner periphery 112 which is provided with a plurality of ribs 114 and a smooth outer periphery 116. The ribs 114 space the inner hose 100 from the outer hose 110 to allow any fluid which may leak out of the inner hose to be contained by the outer hose and vented away. The corrugation of the inner hose 100 is intended to make the hose more flexible. However, this advantage comes at the cost of disturbing the fluid flow through the inner hose as such flow becomes turbulent due to the corrugations located on the inner periphery 102 of the inner hose.

With reference now to FIG. 2, the double walled hose assembly A is preferably used in a fuel supply and dispenser system B. Such a system can comprise a tank 120 for holding the fuel. Located in a sump 122 directly above the tank 120 is a pump 123 which is used to pump the fuel through various sections of the double walled hose assembly A. These sections are interconnected at a series of sumps, e.g. 124 and 126. The double walled hose assemblies A lead from the pump 123 to a dispenser 128 which is located atop its own sump 130. With reference now also to FIG. 3, each sump, e.g. such as the sump 126, comprises a cylindrical containment vessel 134 having a bottom wall 136. The sump is covered by a cap 138 which is located at a ground level 140 so that the cap can be removed as necessary to obtain access to the sump.

Figure 13:
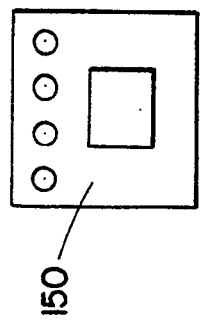
FIG. 13 is a top plan view of another type of fluid sensor which could be located in the sump of FIG. 3.
Figure 12:
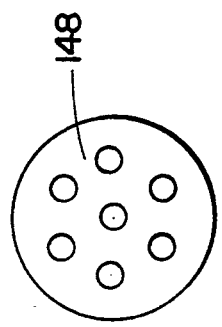
FIG. 12 is a top plan view on an enlarged scale of a first type of fluid sensor such as is located in the sump illustrated in FIG. 3.

Preferably located within the sump is a fluid leak detector 142 that has a wire 144 extending therefrom to the ground surface. The detector is utilized to detect any leakage which may occur into the sump. Such detectors may be of the varieties illustrated in FIGS. 12 and 13. FIG. 12 discloses a detector 148 which can be on the order of a conventional liquid level sensor that is available from a number of manufacturers. Alternatively, the sensor can be a chemical sensor 150 such as is illustrated in FIG. 13. Such a chemical sensor can, e.g. detect the presence of hydrocarbon fuel and thereby trip an alarm indicating that a fuel leak has taken place. Such chemical sensors are available from, e.g. Anderson Labs of Bloomfield, Conn. and Allied Precision Electronics of College Station, Tex.

As is evident from FIGS. 2 and 3, the double walled hose assembly A is flexible and is bent in order to connect the sump 126 to the sump 130, as shown in FIG. 2, and in order to conduct the fuel in the sump 130 to the dispenser 128. In this connection, the bend radius of the assembly is such that the inner hose has a bend radius of 14" (35.56 cm) and the combination of inner hose and outer hose, i.e. the double walled hose assembly, has a bend radius of approximately 16" (40.64 cm). The sumps at each end of the double walled hose assembly can be on the order of 50 feet (15.24 m) apart or even up to 150 to 200 feet (45.72 to 60.96 m) apart.

The burst strength of the inner hose 10 is on the order of 600 to 700 psi (5516 to 6205.5 KPa) for 1½ inch (3.81 cm) inner diameter hose and the working strength is approximately 150 psi (1034 KPa). Normally, the fuel is pumped through the hose at approximately 60 psi (414 KPa) with spikes up to 100 psi (689.5 KPa). The burst strength of the outer hose 50 is not important. The outer hose needs only to meet two constraints: (1) that it does not dissolve in fuel and (2) that it will not easily be punctured when the trench connecting two sumps is backfilled with gravel or the like.

It should be evident that in the interconnection of sections of the double walled hose assembly, only the sections of the inner hose 10 are coupled to each other. In contrast, the outer hose 50 is simply secured at each end to a respective sump such as the sumps 124 and 126 as shown in FIG. 3.

Figure 15:
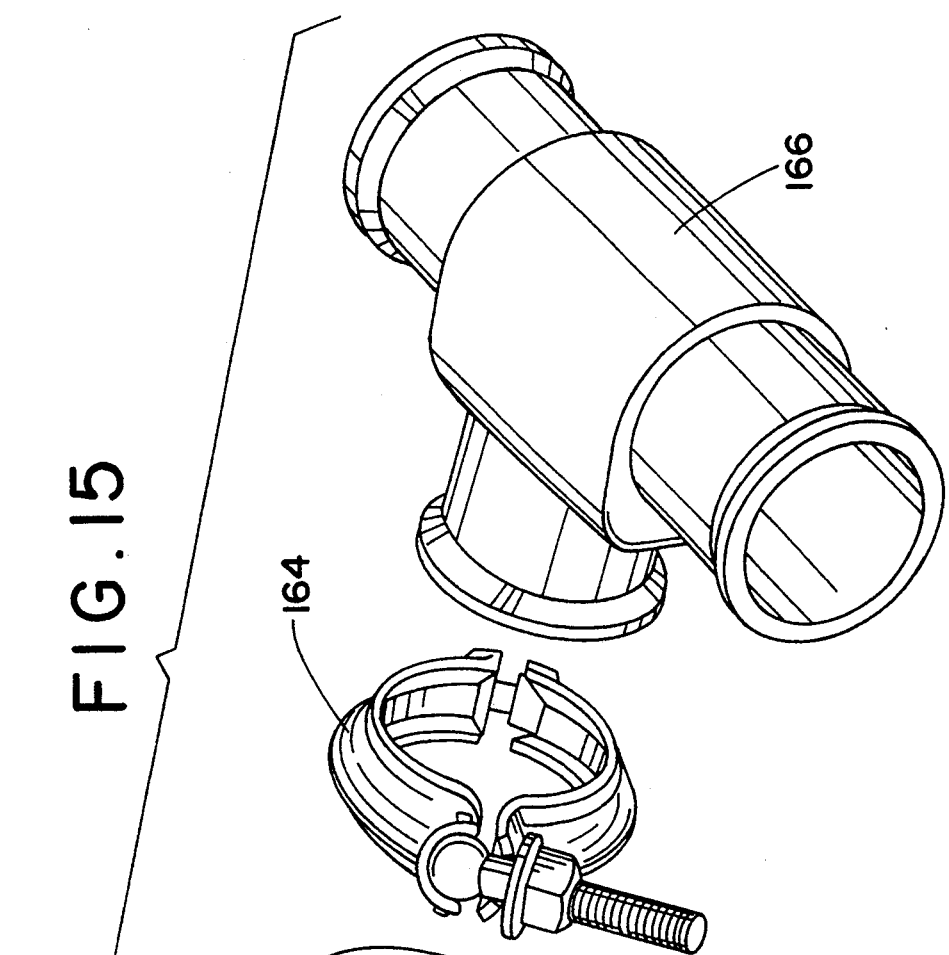

With reference now to FIG. 4, the portion of the fuel hose assembly A located within a sump is there illustrated. As mentioned, only the inner hoses 10 are connected within the sump. For this purpose, a coupling 160 is provided on each end of the inner hose 10. Two such couplings 160 are interconnected by a fitting 162 that is secured at each end to a respective coupling by means of a suitable conventional collar 164 as shown in FIG. 3. The coupling 160, collar 164 and another type of fitting 166 are better shown in FIG. 15. Not shown for the sake of simplicity is a suitable conventional rubber gasket which is located between the coupling 160 and the fitting 166.

In order to conduct an air pressure test on the outer hose 50 to make sure that it is leak proof, a suitable conventional boot 170 can be secured over the end of the outer hose 50 by means of conventional clamping bands 172 and 174 or the like. Once the air pressure test has been performed, the boot can be removed if desired.

The free end of the outer hose 50 extends through a short cuff section 178 of a seal means 180 secured to an inner wall 182 of the sump 126. A suitable conventional band clamp 184 secures the cuff 178 around the outer hose 50 so as to prevent any leaks therebetween.

If desired, a means for sensing the location of a fuel leak through the inner hose 10 can also be provided. Such means can take the shape of a bandlike sensor member 190. As illustrated in FIG. 5, the band 190 can be in the form of a conductive tape 192. Such a tape can be a film of conductive plastic which is affected by being exposed to fuel. One type of material could be a conductive nylon. When contacted by fuel, the conductivity of the nylon tape decreases which indicates that fuel has leaked from the inner hose 10.

Alternately, the band 190 can be in the form of a sensor strip 194 as shown in FIG. 6. The sensor strip can comprise a pair of copper wires 196 that are covered by an insulator material 198. The capacitance of such a sensor strip 194 changes when exposed to fuel. One known type of a band sensor is the TraceTek 500 Longline System which is designed to detect and locate leaks in double walled underground piping and the like. The TraceTek system consists of a hydrocarbon sensing cable connected to an electronic alarm module. When a leak is detected, the module sounds an alarm while displaying a digital readout showing the distance in feet to the leak. The TraceTek 500 system is sold by Raychem Corporation of Menlo Park, Calif.

While in the embodiment of FIG. 4, the band 190 is shown as being wound in a spiral fashion around the periphery of the inner hose 10, it should be appreciated that the band could simply extend longitudinally between the inner hose and the outer hose 50. For example, the band 190 could extend between a pair of the ribs 60 located on the inner periphery 56 of the outer hose 50. Since the ribs 60 run longitudinally along the length of the outer hose 50, the band 190 could simply extend in parallel with the ribs 60 between a pair of such ribs. To this end, the band 60 is preferably fairly thin so as to enable it to fit into the gap formed between the outer periphery 44 of the outer layer 40 of the inner hose 10 and the inner periphery 56 of the outer hose 50 between the ribs 60.

Should there be a leak through the inner hose 10, the outer hose 50 will conduct away such fuel to the nearest sump. Either the band 190 or the detector 142 or both, will signal that a leak has taken place and the pump 123 is then deactivated, either manually or automatically. Thereafter, the hose assembly A having the leaking inner hose 10 is disconnected from adjacent hose assemblies at its couplings after removal of the respective covers 138 on the sumps. Subsequently, the hose assembly is removed (by digging away the overlying surface soil, concrete and the like) and replaced with a new length of hose. That hose is suitably coupled to its respective sumps and respective adjacent hoses. Thereafter, the soil is backfilled over the new hose and new concrete or asphalt is laid on top.

With reference now to FIG. 10, a triple walled hose assembly C is disclosed. The hose assembly C can comprise an inner hose 210 which can be identical to the inner hose 10 illustrated in FIG. 1. Encircling the inner hose 210 is an intermediate hose 212 which includes an inner periphery 214 and an outer periphery 216. Preferably located on the inner periphery of the intermediate hose are a plurality of longitudinally extending ribs 218 which serve to space the inner hose 210 from the intermediate hose 212 thereby allowing any fuel vapor which may escape through the walls of the inner hose 210 to be returned back to an adjacent tank (not illustrated). Encircling the intermediate hose 212 is an outer hose 220 having an inner periphery 222 and an outer periphery 224. Preferably, a plurality of ribs 226 extend radially inwardly from the inner periphery of the outer hose and contact the outer periphery 216 of the intermediate hose so as to space the outer hose away from the intermediate hose. The outer hose 220 is the containment hose which channels any flow of fuel that may be leaked through both the inner hose 210 and the intermediate hose 212 to an adjacent sump.

Figure 11:
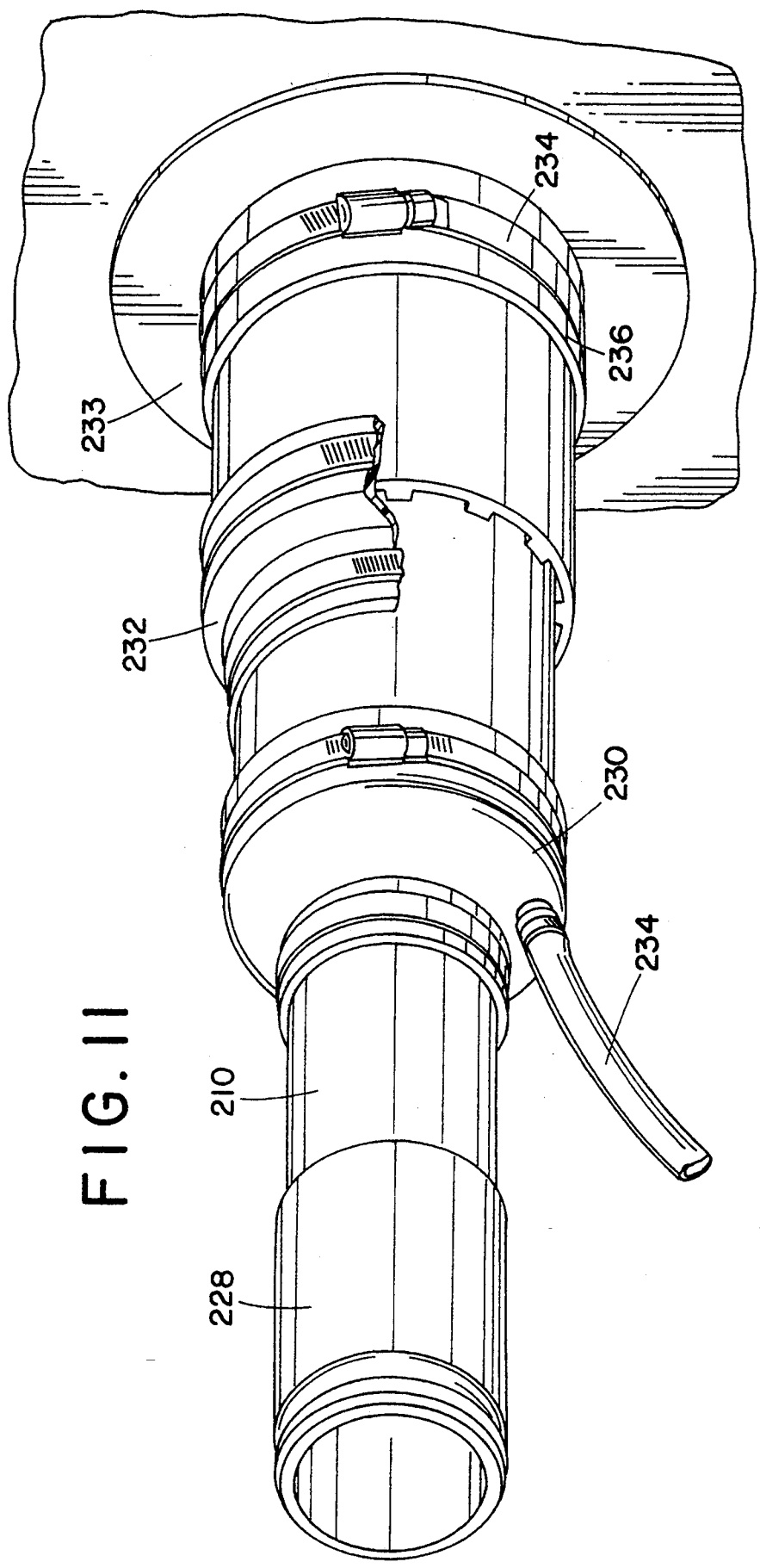
FIG. 11 is a perspective view on an enlarged scale of a portion of the hose assembly of FIG. 10 as it would appear within a sump of the type illustrated in FIG. 3.

With reference now to FIG. 11, the triple walled hose assembly C can be provided with a suitable coupling 228 on its inner hose 210. Suitable boots 230 and 232 can be provided at the ends of the intermediate hose 212 and outer hose 220 respectively. As previously discussed, these are useful for air testing for leaks. Also, the boot 230 can be utilized to vent any fuel fumes through a suitable small diameter hose 234 back to a tank (not illustrated). As in the embodiment of FIG. 4, a seal 233 is provided on the inner surface of the sump. A suitable conventional band clamp 234 is utilized to secure a cuff section 236 of the seal 233 down around the outer periphery 224 of the outer hose 220 in order to prevent leaks therebetween.

The invention has been described with reference to preferred and alternate embodiments. Obviously, modifications and alterations will occur to others upon the reading and understanding of this specification. It is intended to include all such modifications and alterations insofar as they come within the scope of the appended claims or the equivalents thereof.

I claim:

1. A multi-walled hose assembly comprising:
   an elongate inner hose made of resilient, flexible materials, said inner hose comprising
   a fluid-resistant layer;
   an elongate outer hose closely encircling said inner hose, said outer hose being made from a resilient, flexible material; and,
   at least one rib extending between said inner hose and said outer hose, said at least one rib being secured to one of said inner hose and said outer hose wherein said at least one rib contacts the other of said inner hose and said outer hose to retard movement therebetween but is not adhered to said other of said inner hose and outer hose, said at least one rib being made of a resilient, flexible material, wherein the hose assembly can be bent as necessary.

2. The assembly of claim 1 wherein said at least one rib is of one piece with and projects from an inner wall of said outer hose towards a center of said outer hose.

3. The assembly of claim 2 wherein said at least one rib comprises a plurality of ribs and said ribs extend longitudinally along said outer hose so that said inner and outer hoses are concentric.

4. The assembly of claim 1 wherein said at least one rib spirals in a helical configuration between said inner and outer hoses.

5. The assembly of claim 4 wherein said inner hose further comprises a strand of hard material, said hard material giving an outer periphery of said inner hose a ribbed appearance and forming said helically spiraling rib.

6. The assembly of claim 1 wherein said at least one rib comprises a plurality of ribs, said ribs being of one piece with and extending outwardly from an outer periphery of said inner hose.

7. The assembly of claim 1 wherein said inner hose has a corrugated construction, said corrugation being evident on at least one of an inner periphery and an outer periphery of said inner hose.

8. The assembly of claim 1 further comprising a fluid sensor located between said inner and outer hoses for sensing a presence of a fluid leaking out of said inner hose.

9. The assembly of claim 1 further comprising;
   an elongate third hose enclosing said outer hose, said third hose being made of a resilient, flexible material; and,
   at least one second rib positioned between said third hose and said outer hose and, said at least one second rib being secured to one of said third hose and said outer hose and being made of a flexible, resilient material.

10. A multi-walled hose assembly having an outer hose for containing fluid leaks from an inner hose, comprising:
    an elongate inner hose, made of resilient, materials for carrying a pressurized fluid, said inner hose comprising
    a fluid-resistant layer;
    an elongate outer hose closely encircling said inner hose, said outer hose being made from a resilient material, for containing any fluid which may leak out of said inner hose;
    a means for spacing said inner hose from said outer hose so as to form a gap therebetween; and,
    means for frictionally engaging said inner hose and said outer hose, wherein said means for spacing comprises at least one rib which projects from one of an inner wall of said outer hose and an outer wall of said inner hose towards the other hose such that said inner and outer hoses are concentric, wherein said inner hose is thicker than said outer hose to accommodate a pressurized fluid.

11. The assembly of claim 10 wherein said inner hose comprises a fluid resistant inner layer, a tie layer extruded onto said inner layer, a braid layer encircling said tie layer and an outer layer encircling and adhering to said tie layer such that said reenforcing braid is embedded therebetween.

12. The assembly of claim 11 wherein said inner hose further comprises a strand of hard material located between said braid layer and said outer layer, said strand of hard material extending in a helically spiraling configuration, said strand of hard material forming a ribbed outer surface for said inner hose and comprising said at least one rib.

13. The assembly of claim 10 further comprising a fluid sensor located between said inner and outer hoses for sensing a presence of a fluid leaking out of said inner hose.

14. The assembly of claim 10 further comprising a chemical sensor located between said inner and outer hoses for sensing a presence of a chemical leaking out of said inner hose.

15. The assembly of claim 10 further comprising;
    an elongate third hose enclosing said outer hose, said third hose being made of a resilient material so that said third hose is flexible; and,
    a second means for spacing said third hose from said outer hose so as to form a gap therebetween.

16. The assembly of claim 10 wherein said means for frictionally engaging comprises an outer surface of said at least one rib, wherein said at least one rib outer surface contacts a surface of the other of said inner hose and said outer hose to retard a movement therebetween but is not adhered to said surface of said other of said inner hose and said outer hose.

17. A leak-resistant fuel hose assembly comprising:
    an elongate flexible inner fuel-carrying hose comprising resilient materials which inner hose is resistant to a seepage of fuel therethrough, said inner hose being sufficiently thick to withstand a flow of pressurized fuel therethrough;

an elongate flexible containment hose enclosing said inner hose, said containment hose being thinner than said inner hose and being made from a resilient material;

an annular gap formed between said inner hose and said containment hose, wherein said containment hose contains any fuel which may have leaked or seeped out of said inner hose and into said gap; and, at least one rib extending between said inner hose and said containment hose in said annular gap for spacing said inner hose from said outer hose, said at least one rib being of one piece with one of said inner hose and said outer hose and frictionally engaging the other of said inner hose and said outer hose to retard movement therebetween, said at least one rib being made of a resilient material.

18. The assembly of claim 17 further comprising;

an elongate third hose enclosing said containment hose, said third hose being made of a flexible resilient material;

a second annular gap formed between said containment hose and said third hose; and, at least one second rib extending in said second annular gap between said third hose and said containment hose and secured to at least one of said third hose and said containment hose, said at least one second rib being made of a flexible resilient material.

19. A piping system for conveying a fluid from an outlet port of a pump to the inlet port of an above-ground fluid dispenser, comprising:

a fluid transfer hose of a flexible material having an inlet end and an outlet end, said fluid transfer hose comprising a fluid-resistant layer, wherein said fluid transfer hose is resistant to a seepage of fluid through a wall thereof and is sufficiently thick to withstand a flow of a pressurized fluid therethrough;

a containment hose of a flexible material having a first end and a second end, said containment hose surrounding said fluid transfer hose wherein said containment hose is thinner than said fluid transfer hose;

a rib for spacing said fluid transfer hose from said containment hose so as to form a gap therebetween, said gap containing any fluid which may be leaked by said fluid transfer hose, wherein said rib is secured to one of said fluid transfer hose and said containment hose and contacts the other of said fluid transfer hose and said containment hose;

a first coupling to which an inlet end of said fluid transfer hose is secured; and, a second coupling to which said outlet end of said fluid transfer hose is secured.

20. The system of claim 19 further comprising:

a first sump to which said first end of said containment hose is secured; and, a second sump to which said second end of said containment hose is secured.

21. The system of claim 20 further comprising a third coupling which secures said containment hose first end to said first sump, wherein said containment hose is shorter than said fluid transfer hose such that said fluid transfer hose extends through said third coupling.

22. The system of claim 20 further comprising a fourth coupling which secures said containment hose second end to said second sump, wherein said fluid transfer hose is longer than said containment hose such that said fluid transfer hose extends through said fourth coupling.

23. The system of claim 19 further comprising;

a boot which is detachably secured to an end of said containment hose; and, fastening means for securing said boot to said fluid transfer hose and said containment hose to allow a pressure test to be conducted on said containment hose.

* * * * *